Dec. 25, 1956  J. R. ALBRIGHT  2,775,209
LUBRICATION MEANS FOR ROTARY PUMPS
Original Filed June 14, 1946

Inventor
John R. Albright
By McCanna and Morsbach
Attys.

United States Patent Office 2,775,209
Patented Dec. 25, 1956

2,775,209
LUBRICATION MEANS FOR ROTARY PUMPS

John R. Albright, Rockford, Ill., assignor to Geo. D. Roper Corporation, Rockford, Ill., a corporation of Illinois Original application June 14, 1946, Serial No. 676,818, now Patent No. 2,612,113, dated September 30, 1952. Divided and this application September 4, 1952, Serial No. 307,881

6 Claims. (Cl. 103—126)

This invention relates to a lubrication arrangement for rotary pumps or fluid motors.

It is an object of this invention to provide an improved lubrication arrangement for rotary pumps or fluid motors.

It is also an object of this invention to provide a novel lubrication arrangement for a rotary pump or fluid motor in which a portion of the fluid displaced by the fluid displacement mechanism of the device is recirculated through bearings for the fluid displacement mechanism to lubricate the same.

Another object of this invention is to provide a novel arrangement for lubricating the fluid displacement mechanism in a rotary pump or fluid motor which includes lubrication grooves located at the unloaded side of bearings for the fluid displacement mechanism and communicating between the pressure and exhaust sides of the device to continuously recirculate for lubrication purposes a portion of the fluid displaced by the fluid displacement mechanism of the pump or fluid motor.

Other and further objects and advantages of the invention will be apparent from the following description of a preferred embodiment thereof, which is shown in the accompanying drawing to illustrate the principles of the present invention.

Figure 1:
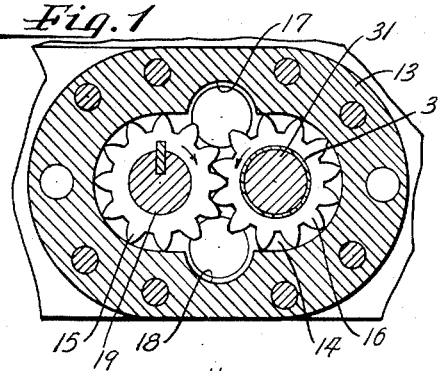
Figure 1 is a transverse section through the fluid displacement chamber in the pump or fluid motor of the present invention.
Figure 2:
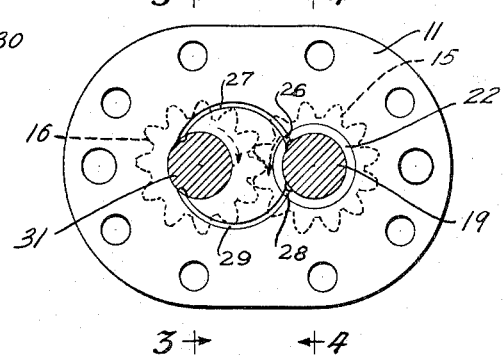
Figure 2 is a view similar to Fig. 1, but taken at the inner face of one of the end plates of the casing which encloses the fluid displacement chamber in the pump or fluid motor, the gears being indicated in dotted lines to illustrate the relation of the parts.
Figure 3:
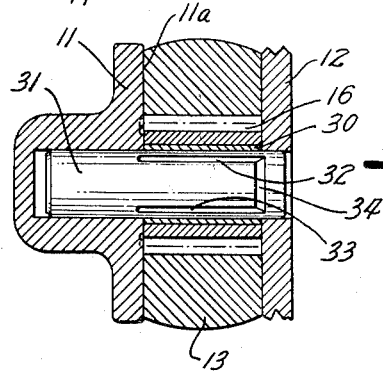
Figure 3 is a section taken along the line 3—3 in Fig. 2.

Referring to the drawings, in the illustrated embodiment of the invention there is shown an hydraulic gear pump or fluid motor which is enclosed in a casing which includes the spaced end plates 11 and 12 (Figs. 3 and 4) and an oblong annular member 13 which is clamped between the end plates and which together with the end plates defines the pump chamber 14 (Fig. 1). Within this pump chamber are located the driving gear 15 and the driven gear 16, which are in mesh. At opposite sides of the meshing gears the casing is provided with pressure and exhaust passages 17 and 18 through which fluid is passed to and from the fluid displacement chamber 14.

Figure 4:
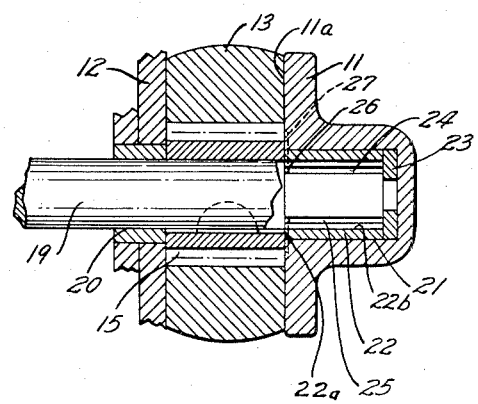
Figure 4 is a section taken along the line 4—4 in Fig. 2.

The driving gear 15 is keyed to a shaft 19, which is the drive shaft when the device is operated as a pump and which in that event may be driven by any suitable prime mover, such as an electric motor. The drive shaft 19 extends through a bushing 20 located in the front end plate 12 (Fig. 4). The back end plate 11 of the casing is formed with a bore 21 in which is located a tubular bearing 22 for the inner end of the drive shaft 19. The bearing 22 at its front end presents an end face 22a (Figs. 4 and 5) which extends flush with the inner end face 11a of the back end plate 11 of the casing. At the back end of this recess 21 is located a flat annular end bearing member 23.

Figure 5:
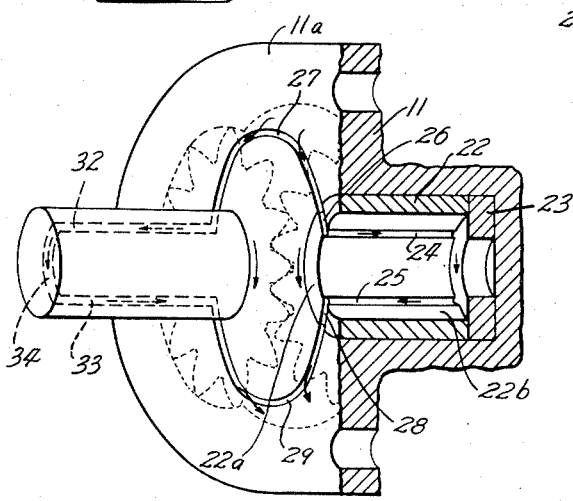
Figure 5 is a fragmentary perspective view of the device, with the gears being superposed in dotted lines to illustrate their operation.

As best seen in Fig. 5, the tubular bearing 22 is formed at its inner shaft-engaging surface 22b with spaced longitudinally extending lubrication grooves 24 and 25, which extend the full length of the bearing 22 and which are adapted to communicate with each other at their inner ends by means of the space between the end of drive shaft 19 and the adjacent face of the end bearing plate 23. At its outer end the groove 24 communicates with an arcuate groove or channel 26 formed in the front end face 22a of the tubular bearing 22. This groove 26 communicates with an arcuate groove or channel 27, which is formed in the inner face 11a of the back end plate 11 and which communicates with the pressure passage 17 in the casing. The other longitudinal groove 25 in the bearing 22 communicates with an arcuate groove 28 formed in the front end face 22a of bearing 22. Groove 28 communicates with an arcuate groove or channel 29 formed in the inner face 11a of the back end plate 11 and communicating with the exhaust passage 18 in the casing.

By virtue of these grooves, the drive shaft 19 is continuously lubricated along the entire length of its bearing 22 in the following manner: Part of the fluid discharged from the fluid displacement chamber to the pressure passage 17 is recirculated back through the groove 27 in the inner face 11a of end plate 11, groove 26 in the front end face 22a of bearing 22, groove 24 extending lengthwise along the bearing surface 22b of the bearing 22, through the space between the end of shaft 19 and the bearing member 23, back along grooves 25 and 28 in bearing 22 and thence through groove 29 in the end plate 11 to the exhaust side of the pump. Thus, it will be seen that the lubrication grooves are co-related with the operation of the pump so that there is supplied to the bearing surface 22b of the bearing 22 a continuous stream of recirculated fluid for lubricating the drive shaft 19 supported thereat.

The driven gear 16 is carried on a bushing 30 mounted rotatably on the idler shaft 31 (Fig. 3) which is supported by the end plates 11 and 12 of the casing. The idler shaft is formed on its periphery with a pair of longitudinally extending lubrication grooves 32 and 33 which are interconnected by a transverse groove 34 also formed in the periphery of the shaft. It is to be noted that the grooves 32 and 33 extend the full length of the bearing bushing 30 for the idler gear 16. From Fig. 3, it is seen that the grooves 32 and 33 both terminate just beyond the inner face 11a of the end plate 11. These grooves communicate respectively with the arcuate grooves 27 and 29 formed in the inner face 11a of the end plate 11.

With this arrangement, a portion of the fluid discharged from the pump to the pressure passage 17 is recirculated through the groove 27 in the inner face 11a of the end plate 11, through grooves 32 and 34 in idler shaft 31, back through the idler shaft groove 33 and thence through the groove 29 in the inner face 11a of end plate 11 to the exhaust side of the pump. In this manner the bearing support for the rotary driven gear 16 is lubricated along its entire length.

It will be noted that the oil grooves 26, 24, 28, 25 at the bearing for the drive shaft 19 are located at the unloaded side of the drive shaft. That is, the fluid pressure unbalance between the pressure and exhaust sides of the pump exerts a force on the driving gear 15 which tends to force it and the drive shaft 19 outwardly at an angle away from the driven gear 16. Since the driving gear 15 is connected rigidly to the drive shaft 19 the drive shaft is thus forced or "loaded" outwardly away from the driven gear and is therefore spaced closest to the bearing face 22b of its bearing 22 at the side of the bearing remote from the oil grooves therein. This location of the oil grooves is important in order to insure that the oil grooves do not interfere with the establishing of a suitable lubricating film between the drive shaft and its bearing at the loaded side of the drive shaft, since if the oil grooves in the bearing were located at the loaded side of the drive shaft they would draw off oil where the spacing between the drive shaft and its bearing is the least and thus might destroy entirely the lubricating film between the drive shaft and its bearing at the loaded side of the drive shaft.

It is also to be noted that, if the direction of rotation of the pump gears is reversed from that shown in the drawing, the oil grooves in the drive shaft bearing are still on the unloaded side of the drive shaft. By reversing the rotation of the driving gear 15 the angle at which it is loaded outwardly away from the driven gear would change but the loaded side of the drive shaft would still be remote from the oil grooves in the bearing 22.

In like manner, the oil grooves at the bearing for the driven gear 16 are located at the unloaded side. In either direction of rotation of the gears the driven gear 16 will be pressure loaded outwardly away from the driving gear 15, due to the pressure unbalance between the pressure and exhaust sides of the pump. The driven gear 16 will thus tend to force its bearing sleeve 30 against the stationary shaft 31 at the side of this shaft closest to the drive shaft 19. Due to this action, the loaded side of the bearing 30 is at this side of the shaft 31 and it is here that the lubricating film between bearing 30 and shaft 31 is thinnest. To insure the maintenance of this lubricating film at the loaded side of the shaft for the driven gear, the oil grooves 32—34 in this shaft are located at its unloaded side.

While the above description has been directed toward an embodiment of the present invention operated as a pump, it will be readily apparent that the principles and construction of the lubrication arrangement of the present invention would be unchanged if it were operated as a fluid motor.

While in the foregoing description of the device operating as a pump and in the claims the terms "driving gear" and "driven gear" are used in referring to the respective gears in the device, it is to be understood that these terms are descriptive only and are not intended to suggest that the device cannot as readily be used as a fluid motor, wherein neither gear is normally considered to be a "driving gear."

While in the foregoing description and in the accompanying drawing there has been disclosed a specific preferred embodiment of the present invention, it is to be understood that various modifications, omissions and refinements departing from the disclosed embodiment of the invention may be adopted without departing from the spirit and scope of this invention.

This application is a division of my co-pendng applicaton Serial No. 676,818, filed June 14, 1946, now U. S. Patent No. 2,612,113, issued September 30, 1952.

I claim:

1. A rotary pump or fluid motor comprising a casing defining a fluid displacement chamber and having pressure and exhaust passages at opposite sides of the fluid displacement chamber, a rotary driving gear in said chamber, means supported within the casing defining a bearing supporting the driving gear for rotation, a rotary driven gear located within the fluid displacement chamber in meshing relation to the driving gear, and means defining a pair of lubrication grooves in the bearing extending longitudinally thereof and communicating with each other at one end thereof and with the pressure and exhaust passages respectively at the other ends thereof for recirculating through the lubrication grooves a portion of the fluid displaced through the fluid displacement chamber to lubricate the bearing for the driving gear, said grooves being each angularly spaced substantially less than 90° from the mesh point of the gears and located remote from the point at which the thrust is placed on the bearing due to the radial hydraulic thrust on the gears produced by the fluid pressure acting on the periphery of the driving gear.

2. A rotary pump or fluid motor comprising a casing defining a fluid displacement chamber and having pressure and exhaust passages at opposite sides of the fluid displacement chamber, a rotary driving gear disposed in said chamber, means supported within the casing defining a bearing supporting the driving gear for rotation, a rotary driven gear located within the fluid displacement chamber in meshing relation to the driving gear, and means defining a pair of lubrication grooves in the bearing extending longitudinally thereof and communicating wtih each other at one end thereof and with the pressure and exhaust passages respectively at the other ends thereof for recirculating through the lubrication grooves a portion of the fluid displaced through the fluid displacement chamber to lubricate the bearing for the driving gear, said grooves being angularly spaced apart approximately 90° from each other and symmetrically located with respect to the mesh point of the gears and at the side of the bearings adjacent the mesh point whereby the grooves are located remote from the point at which the thrust is placed on the bearing due to the radial hydraulic thrust on the gears independent of the direction of operation of the pump or motor.

3. A rotary pump or motor comprising a casing defining a fluid displacement chamber and including an end plate closing one end of the chamber, means defining pressure and exhaust passages at opposite sides of the fluid displacement chamber, a rotary drive shaft, a bearing mounted in said end plate and rotatably supporting said drive shaft, a driving gear mounted on said drive shaft and disposed in said fluid displacement chamber, an idler shaft non-rotatably mounted in said casing and extending across said chamber, a driven gear having a bearing bushing rotatably mounted on said idler shaft in meshing relation to the driving gear, means defining a first pair of lubrication grooves formed in the bearing for the drive shaft extending along the entire length thereof and communicating at the end remote from the driving gear, said first pair of grooves being angularly spaced substantially less than 90° from the mesh point of the gears and located remote from the point at which the thrust is placed on the bearing for the drive shaft due to the radial hydraulic thrust on the drive gear, means defining a second pair of lubrication grooves formed in the edler shaft extending along the full length of said bearing bushing and communicating with each other at the ends remote from said end plate, said second pair of lubrication grooves being angularly spaced apart substantially less than 90° from a plane through the axes of said gears and at the side of said idler shaft remote from the mesh point of the gears to be located remote from the point at which the thrust is placed on said idler shaft by the radial hydraulic thrust on the driven gear, and means defining a pair of lubrication grooves formed in the inner face of said end plate and each communicating intermediate the ends thereof respectively with the pressure and exhaust passages, each of said grooves in the end plate communicating with one of the grooves in each the idler shaft and in the bearing for the drive shaft to thereby recirculate through the lubrication grooves a portion of the fluid displaced through the fluid displacement chamber to lubricate the bearings.

4. A rotary pump or motor comprising a casing defining a fluid displacement chamber and including an end plate closing one end of the chamber, means defining pressure and exhaust passages at opposite sides of the fluid displacement chamber, a rotary drive shaft, a bearing mounted in said end plate and rotatably supporting said drive shaft, a driving gear mounted on said drive shaft and disposed in said fluid displacement chamber, an idler shaft non-rotatably mounted in said casing and extending across said chamber, a driven gear having a bearing bushing rotatably mounted on said idler shaft in meshing relation to the driving gear, means defining a first pair of lubrication grooves formed in the bearing for the drive shaft extending along the entire length thereof and communicating at the end remote from the driving gear, said first pair of grooves being angularly spaced apart approximately 90° from each other and symmetrically located with respect to the mesh point of the gears at the side of the bearing adjacent the mesh point of the gears, means defining a second pair of lubrication grooves formed in the idler shaft extending along the full length of the bearing bushing and communicating with each other at the ends remote from the end plate, said second pair of grooves being angularly spaced apart approximately 90° from each other and symmetrically located with respect to a plane through the axes of the gears at the side of the idler shaft remote from the mesh point of the gears, whereby the grooves in each the idler shaft and in the bearing for the drive shaft are located remote from the point at which the thrust is placed on the bearings due to the radial hydraulic thrust on the respective gears.

5. A rotary pump or fluid motor comprising a drive gear and a driven gear meshing with the drive gear, a casing surrounding said gears and having high and low pressure passages at opposite sides of the mesh point of the gears, said casing having curved side walls extending into close running fit with the gear peripheries at the sides thereof opposite the mesh point of the gears and defining a seal area at the gear peripheries, a drive shaft connected to said drive gear, and means supported in the casing defining a bearing disposed concentric with one of said curved side walls for supporting the drive shaft, said bearing having a pair of longitudinally extending lubrication grooves formed therein and angularly spaced apart a distance less than 180° from each other, said grooves communicating with each other at the ends thereof remote from the gears and with the pressure and exhaust passages respectively at the opposite ends thereof for recirculating through the lubrication grooves a portion of the fluid displaced through the casing, said grooves being located at the side of the drive shaft opposite the seal area on the drive gear and substantially symmetrically between the ends of said one of said curved side walls of the casing whereby the grooves are each disposed at a point remote from the point at which the thrust is placed on the bearing due to the radial hydraulic thrust on the periphery of the drive gear.

6. A rotary pump or fluid motor comprising a drive gear and a driven gear meshing with the drive gear, a casing surrounding said gears and having high and low pressure passages at opposite sides of the mesh point of the gears, said casing having curved side walls extending into close running fit with the gear peripheries at the sides thereof opposite the mesh point of the gears and defining a seal area at the gear peripheries, a drive shaft connected to said drive gear, means supported in the casing defining a bearing disposed concentric with one of said curved side walls for supporting the drive shaft, said bearing having a pair of longitudinally extending lubrication grooves formed therein and angularly spaced apart a distance less than 180° from each other, said grooves communicating with each other at the ends thereof remote from the gears and with the pressure and exhaust passages respectively at the opposite ends thereof for recirculating through the lubrication grooves a portion of the fluid displaced through the casing, said grooves being located at the side of the drive shaft opposite the seal area on the drive gear and substantially symmetrically between the ends of said one of said curved side walls of the casing whereby the grooves are each disposed at a point remote from the point at which the thrust is placed on the bearing due to the radial hydraulic thrust on the periphery of the drive gear, and an idler shaft mounted on said casing and rotatably supporting said driven gear thereon, said idler shaft having a pair of longitudinally extending lubrication grooves formed therein and angulary spaced apart less than 180° from each other, said grooves being located at the side of the idler shaft adjacent the seal area on the driven gear and substantially symmetrically between the ends of the other of said curved side walls of the casing whereby the grooves in the idler shaft are each disposed at a point remote from the point at which the thrust is placed on the idler shaft due to the radial hydraulic thrust on the periphery of the driven gear.

References Cited in the file of this patent

UNITED STATES PATENTS

| | | |
|---|---|---|
| 1,271,970 | Wood | July 9, 1918 |
| 1,372,576 | Tullmann | Mar. 22, 1921 |
| 1,379,587 | Fisher | May 24, 1921 |
| 1,910,083 | Bevill | May 23, 1933 |
| 1,972,271 | McIntyre | Sept. 4, 1934 |
| 2,212,994 | Vrolix | Aug. 27, 1940 |
| 2,221,412 | Rose | Nov. 12, 1940 |
| 2,276,107 | Simons | Mar. 10, 1942 |
| 2,319,374 | Ungar | May 18, 1943 |
| 2,479,077 | McAlvay | Aug. 16, 1949 |
| 2,481,143 | Muller | Sept. 6, 1949 |

OTHER REFERENCES

Ser. No. 433,808, Muller (A. P. C.), published July 13, 1943.